United States Patent [19]

Rombouts

[11] Patent Number: 5,147,032
[45] Date of Patent: Sep. 15, 1992

[54] CONVEYOR SYSTEM WITH DRIVEN BALLS, PROTECTABLE AGAINST OVERLOADING

[75] Inventor: Nico Rombouts, Hoofddorp, Netherlands

[73] Assignee: FMC Corporation, Chicago, Ill.

[21] Appl. No.: 640,513

[22] Filed: Jan. 11, 1991

Related U.S. Application Data

[63] Continuation of Ser. No. 295,247, Jan. 11, 1989, abandoned.

[30] Foreign Application Priority Data

Jan. 15, 1988 [EP] European Pat. Off. ........ 88200063.1

[51] Int. Cl.$^5$ .............................................. B65G 13/06
[52] U.S. Cl. .................................... 198/789; 198/372; 198/787; 193/35 MD
[58] Field of Search ................ 198/789, 372, 787; 193/35 MD

[56] References Cited

U.S. PATENT DOCUMENTS

| | | | |
|---|---|---|---|
| 3,828,917 | 8/1974 | Oestergren | 198/412 |
| 3,888,342 | 6/1975 | Geller | 198/789 |
| 3,920,290 | 11/1975 | Evarts | 193/35 MD |
| 4,681,211 | 7/1987 | Lödige et al. | 198/789 |
| 4,852,721 | 8/1989 | Stille | 198/782 |

FOREIGN PATENT DOCUMENTS

| | | |
|---|---|---|
| 180710 | 6/1985 | European Pat. Off. . |
| 1237003 | 3/1967 | Fed. Rep. of Germany . |
| 2192050 | 2/1974 | France . |
| 7300241 | 7/1973 | Netherlands . |
| 8907081 | 8/1989 | PCT Int'l Appl. .......... 198/787 |

*Primary Examiner*—Robert P. Olszewski
*Assistant Examiner*—Cheryl L. Gastineau
*Attorney, Agent, or Firm*—Ronald C. Kamp; R. B. Megley

[57] ABSTRACT

A conveyor system with driven balls, in which each driven ball is supported by at least one driving roller. The point of contact between the driving roller and the ball is located at some distance below the horizontal plane through the center of the ball, which distance is smaller than the radius of the ball.

2 Claims, 9 Drawing Sheets

FIG_4

FIG_3

FIG_5

FIG_13

FIG_6

FIG_7

FIG_8

FIG_14

FIG_15

FIG_10

FIG_11

CONVEYOR SYSTEM WITH DRIVEN BALLS, PROTECTABLE AGAINST OVERLOADING

The invention relates to a conveyor system with driven balls in which each driven ball is supported by at least one driving roller.

A system of this kind is described in EPA 180710, where each driven ball is supported by a driving shaft mounted vertically below the centre of the ball. The full vertical load of the balls must be taken up by the driving shaft and by the bearings in which this shaft is supported. This known conveyor system is exclusively suited to the displacement of the goods in one direction.

The object of the present invention is to provide an improved system of the kind mentioned hereinbefore, which system is particularly suitable for the transportation and assortment of goods in boxes or on pallets and the like, whereby heavy loads can easily be taken up and the system has an inbuilt protection against overloading, and whereby it is moreover possible to improve the conveyor system in a simple fashion to make it suitable for the displacement of goods in different directions.

To achieve this object, it is proposed according to the invention to position the point of contact between the driving roller and the ball in a system of the kind mentioned hereinbefore at some distance below the horizontal plane of the ball, which distance is smaller than the radius of the ball. In a few instances, driving rollers may be positioned in the horizontal plane through the centre of the ball. In a conveyor system designed along these lines, the driven balls rest sideways against a driving roller or, when several driving rollers are applied, between the driving rollers. In consequence of the wedge effect, a considerable driving force can thereby be transmitted between the ball and the roller. Heavy loads experience a greater driving force, light loads a smaller one.

A further asset is that this ball drive can be rendered safe: if humans, for instance, step onto a rotating ball, this ball must stop. In actual practice it has been found that, if both the ball and the rollers have been made of, for instance, steel, both heavy and light loads can be reliably moved and experience a sufficient driving force, while the ball can still be stopped simply by hand or with a shoe. This can be accounted for in the following way.

The drive force on the shoe or the hand depends not only upon the vertical load on the ball but also upon the coefficients of friction between the ball and the rollers and between the ball and the shoe or hand. The coefficient of friction between the shoe or hand and the ball is far greater than that between the ball and the roller (both made of steel in the example). Without causing injury or damage to hand or shoe, the rollers will then slip and not drive the ball.

Furthermore, the system claimed in EPA 180710 is by nature unstable: the balls must be maintained in position above the drive shaft, which causes friction. The claimed system supports the ball with stability.

In a preferred embodiment of the conveyor system according to the invention, each driven ball is supported by four driving rollers, i.e. two pairs of two rollers aligned in parallel to each other, whilst provision has been made for an independent drive unit for each pair of parallel driving rollers. Conveniently, adjacent bearings of a driving roller of each pair may be located either in a support rotating on a vertical axis or in a support which is flexible in a vertical direction. Thereby, uniform loading of the driving rollers and a simple safeguard against overloading are achieved.

The use of two pairs of two driving rollers aligned in parallel, each having its own drive unit, makes it possible to drive alternately one pair or the other. The direction of the displacement of the goods induced by the driven balls will thereby shift through 90 degrees. This shift is brought about because the effective radius of the driving roller pair vis-à-vis the centre of the ball is equal to the radius of the ball, whereas the effective radius of the non-driving roller pair is considerably smaller, so that the friction produced by this non-driving roller pair can easily be overcome.

In another preferred embodiment of the conveyor system according to the invention, each driven ball is supported by three driving rollers in or near a horizontal plane. These driving rollers are preferably positioned such relative to one another that together they form an equilateral triangle and thus support the ball uniformly. In addition, these driving rollers are provided with independent drive units. By proper adjustment of the rotating speeds of the driving rollers it is possible to drive the ball in arbitrary directions, enabling the load resting on the ball to be propagated in all directions. The internal friction in this system between the ball and the driving rollers is at a minimum, if the rotating speeds of the driving rollers is chosen such that the ball rotates on an axis in the horizontal plane. It is to be noted that the German patent application DT AS 1237003 describes a conveyor system with driven balls where drive units are coaxially disposed in pairs for selectively driving the balls under an axial thrust. In this set-up, however, the driving force depends on the axial force exerted, whilst the weight of the goods to be conveyed plays no part.

Also, special provision must be made for the vertical support of the balls.

The Netherlands patent application NL 7300241 claims another conveyor system whereby the direction of transportation can be changed. In this design, each driven ball rests upon a disc rotatable on a vertical axis which has to take up the vertical load on the ball and which has to be displaced in its entirety vis-à-vis the driven ball if the direction of transportation is to be changed. In addition, the balls naturally tend to lie unsteady and need to be contained sideways to prevent them from rolling away under the action of the load to be conveyed.

In a conveyor system according to the invention, a change of direction can simply be effected by merely manipulating the drive units of two, three or four driving rollers. Depending on the driving velocities of the various driving rollers, even the direction of transportation can be chosen at will. Moreover, the balls rest naturally in their places, lying consistently steady.

FR-A-2,192,050 describes a system in which each ball is driven by four rollers aligned at an angle of 90 degrees relative to one another, in which provision has been made for independent drive units for each pair of rollers. However, the ball must be supported precisely below the centre and freely rotatable on a horizontal axis, because the driving rollers are disposed in a plane whose level is somewhat above the centre of the ball. The rollers must therefore be pressed against the ball by a separate contrivance, as is the case in the aforementioned DT AS 1237003. The wedge effect induced by the load is lacking. The compressive force for assisting the drive and the support for the load are distinctly separate functions in FR-A-2,192,050. The driving force is therefore dependent not upon the load but on a mechanical setting. Moreover, said conveyor system is unsafe if adjusted to heavy loads.

The invention will now be elucidated in more detail for some embodiments by way of example with reference to the accompanying drawings, in which.

Figure 1:
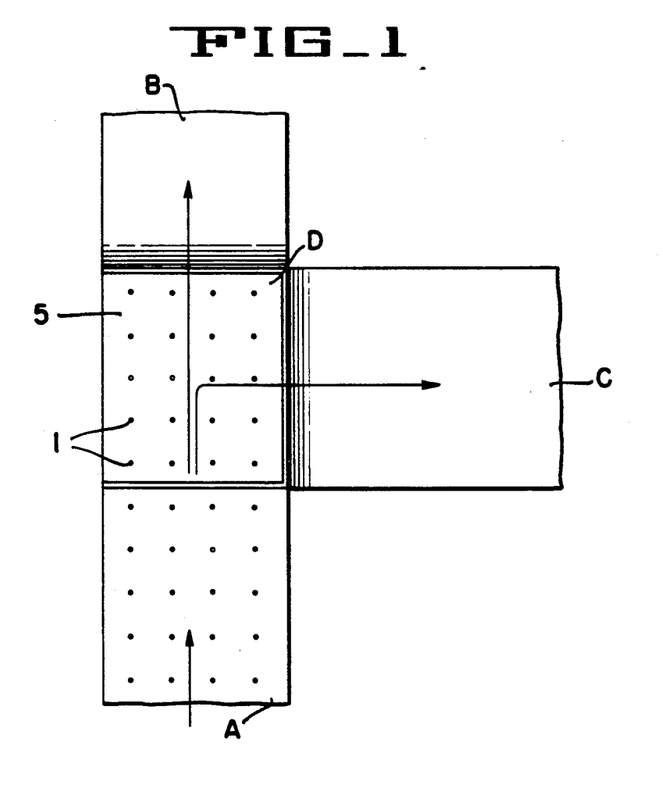
FIG. 1 is a plan view of an embodiment of the conveyor system.

By way of example, FIG. 1 shows the embodiment of a conveyor system in which a side-track C is diverted from a main track A-B. The supply and delivery tracks may, for instance, be line-roll conveyors or conveyor belts (such as B and C). Component part A in the supply track and part D at the point of intersection of these tracks are the subject of this patent application. It is in these parts that the goods to be displaced rest on an adequate number of balls 1, which are each supported at the bottom side in such a manner that they can be driven in the desired direction and with the desired velocity. The whole is closed by a cover plate 5 through which the balls 1 project to a sufficient level.

Figure 2:
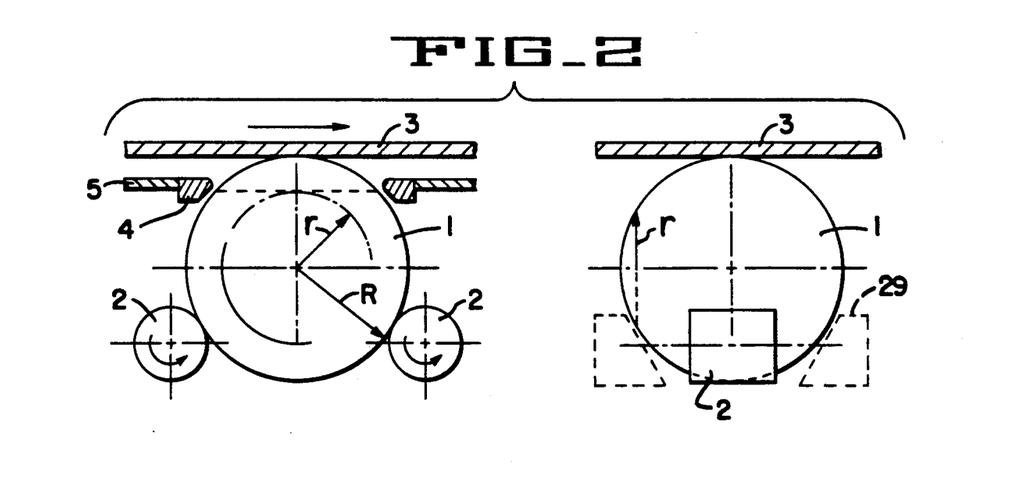
FIG. 2 is a schematic representation of the rectilinear displacement.

FIG. 2 relates to part A and is a sectional side view, showing how each ball must be supported for a rectilinear movement and how the goods 3 are set in motion through the driving force exerted by rollers 2. The ball can be prevented from slipping away sideways by, for instance, a smooth plastic ring 4 or smooth plastic abutments 29 fitted approximately level with the rollers 2. This arrangement makes it possible to produce great driving forces compared with the frictional forces exerted by the lateral support. The farther the rollers 2 are placed apart, the more heavily they press against the ball 1. Hence, the tendency to slip drops and the stability in the direction of drive increases. In addition, the balls tend progressively less to slip away under the action of the load to be displaced. On the other hand, the friction forces have a minimum effect, inasmuch as they are relatively small, because they are only produced by the tendency to roll away sideways;

engage on a smaller radius r, compared with the radius R upon which the driving forces act.

Figure 3:
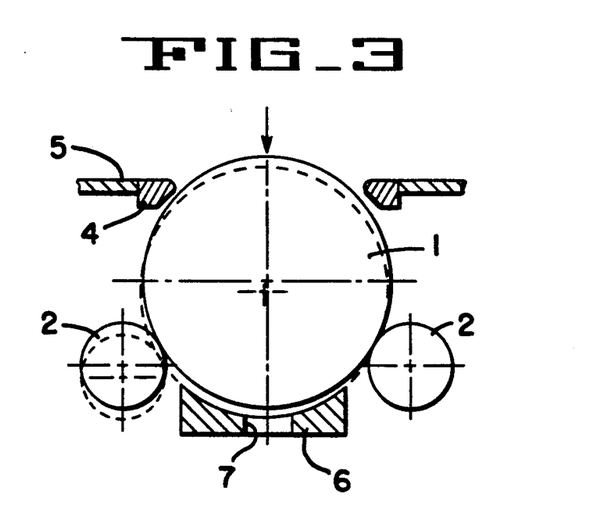
FIG. 3 is a schematic representation of a provision against overloading.

FIG. 3 indicates that it suffices in the event of overloading to make a roller 2 yield flexibly, in order that a support 6 disposed below the ball 1 may absorb the overloading. It is recommended to provide the centre of the support 6 with a drainage slit 7.

Figure 4:
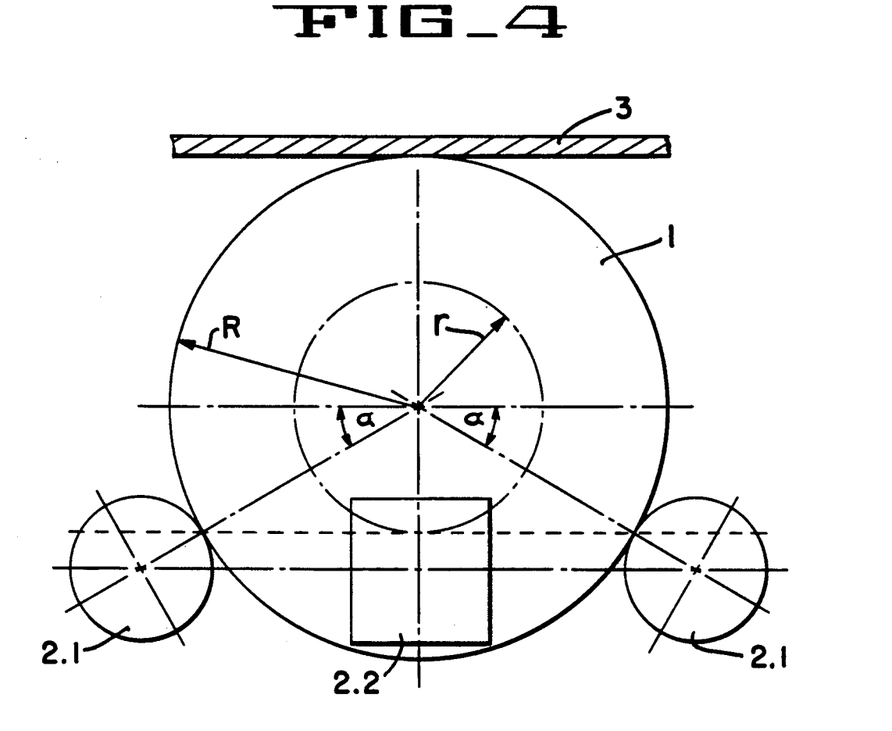
FIG. 4 is a schematic representation of a four-point support.

FIG. 4 relates to part D and is a sectional side view, showing how the ball 1 must be supported for a displacement at right angles. The ball now rests, its weight uniformly distributed, on four rollers 2.1 and 2.2, which may be driven in pairs. The points of contact between the driving rollers and the ball lie in the vertical plane at an angle alpha relative to the horizontal. This angle may vary from 20 to 70 degrees, but lies preferably between 25 and 35 degrees. By actuation of the rollers 2.1 the goods may be moved from left to right in the drawing. Actually, the ball also rests on the rollers 2.2, but friction with the rollers 2.2 will not impede rotation, because the driving forces of the rollers 2.1 act upon a radius R which is far greater than the radius r on which the frictional forces of the rollers 2.2 are acting. If the rollers 2.2 drive the ball 1, the rollers 2.1 will, for the same reason, be unable to hinder this movement. In that case, the goods 3 move in a direction perpendicular to the plane of the drawing.

Figure 5:
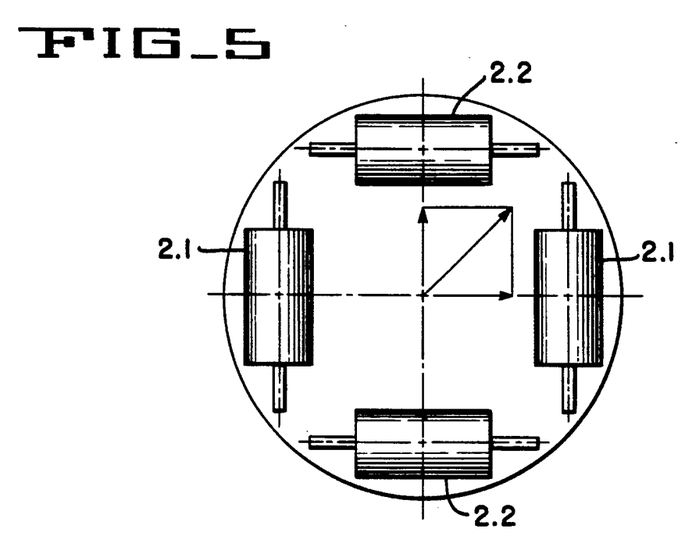
FIG. 5 schematically represents how a displacement in several directions can be effected with the aid of a four-point support.

FIG. 5 is a schematic plan view, showing how a displacement at an angle of 45 degrees can be effected by driving both pairs of rollers 2.1 and 2.2 with the same velocity. In principle, the goods can be moved in any desired direction by driving the pairs of rollers with different velocities and in different directions.

Figure 6:
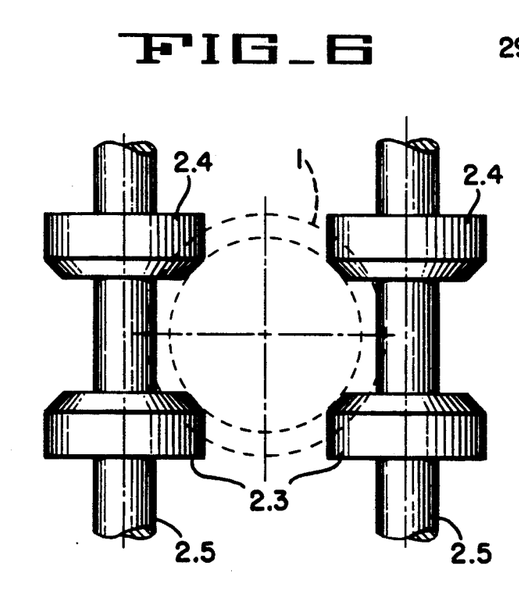
FIG. 6 depicts a variant of the four-point support of FIG. 4. This variant features no intersecting shafts.

FIG. 6 shows how a four-point support can be brought about by installing cones on two parallel shafts 2.5. In this example, the cones 2.3 are the driving rollers and the cones 2.4 have been mounted on the shafts so as to be freely rotatable.

Figure 7:
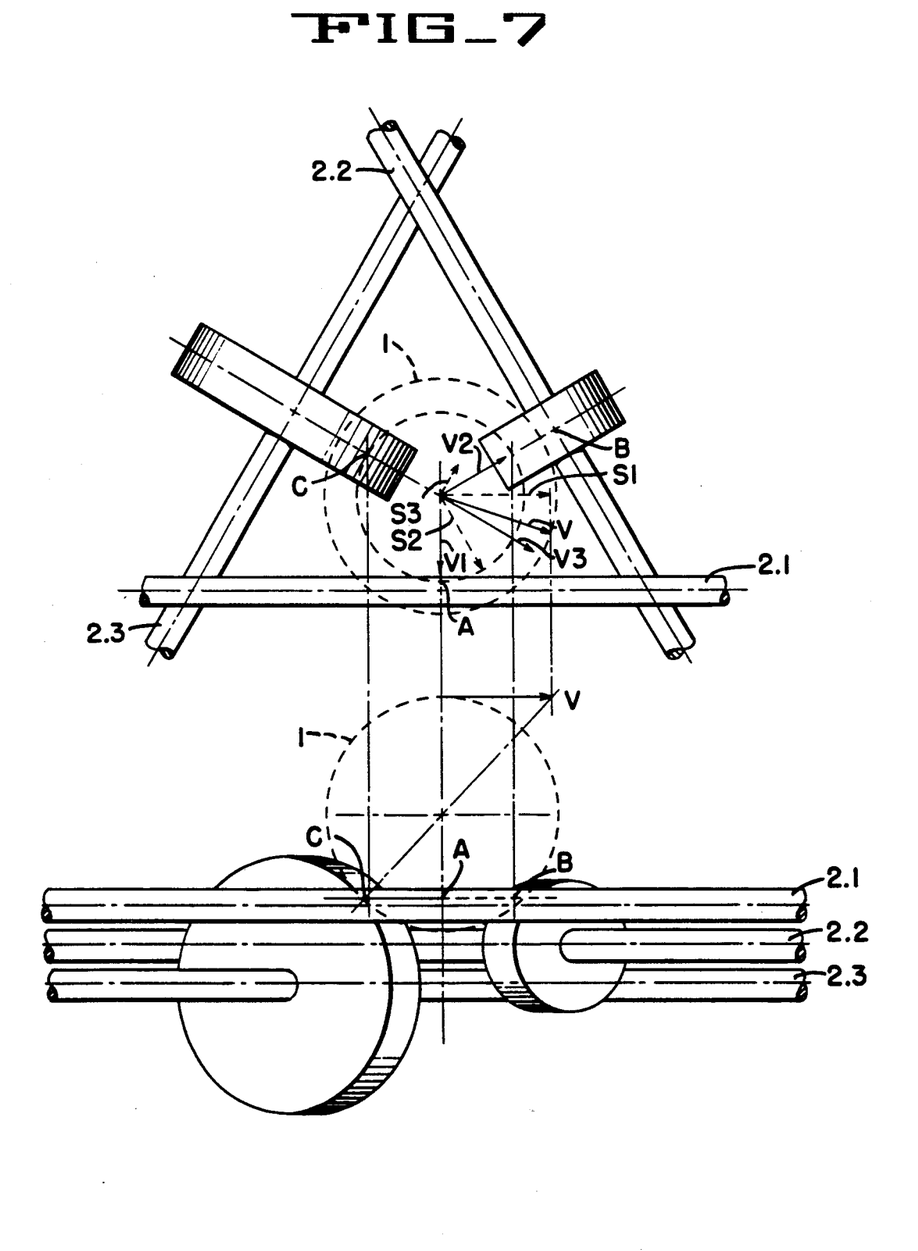
FIG. 7 is a schematic representation of a three-point support.

FIG. 7 again relates to part D of FIG. 1 and is a sectional side view, showing how the ball rests on three rollers (2.1, 2.2, 2.3) which can be driven independently of each other. FIG. 7 also shows how the material to be displaced can be moved in an arbitrary direction with an arbitrary velocity V. V1, V2 and V3 are the peripheral velocities of rollers 2.1, 2.2 and 2.3, respectively. These rollers do not drive the ball with absolute exactness; the dashed lines denoted by S1, S2 and S3 represent the components of V which give rise to slip of the ball relative to the respective rollers. Thus, for instance, component S1 accounts for a slip velocity SL1 in the proximity of roller 2.1.

Figure 8:
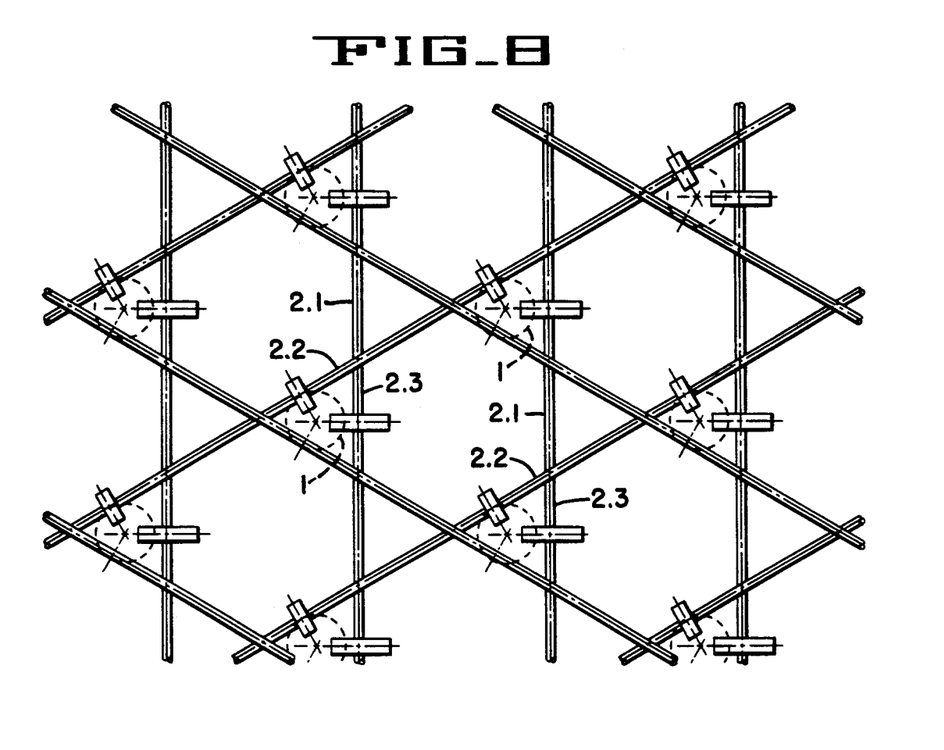
FIG. 8 schematically represents how several balls can simply be driven simultaneously in the same direction.

The rollers 2.2 and 2.3 have an increased diameter at the location of the ball, so that the shafts can intersect. The points of support A, B and C are therefore still in a horizontal plane. FIG. 8 shows how it is thus possible with few continuous shafts to drive many balls simultaneously and in the same direction. With each ball the recurrent pattern is triangular.

Figure 9:
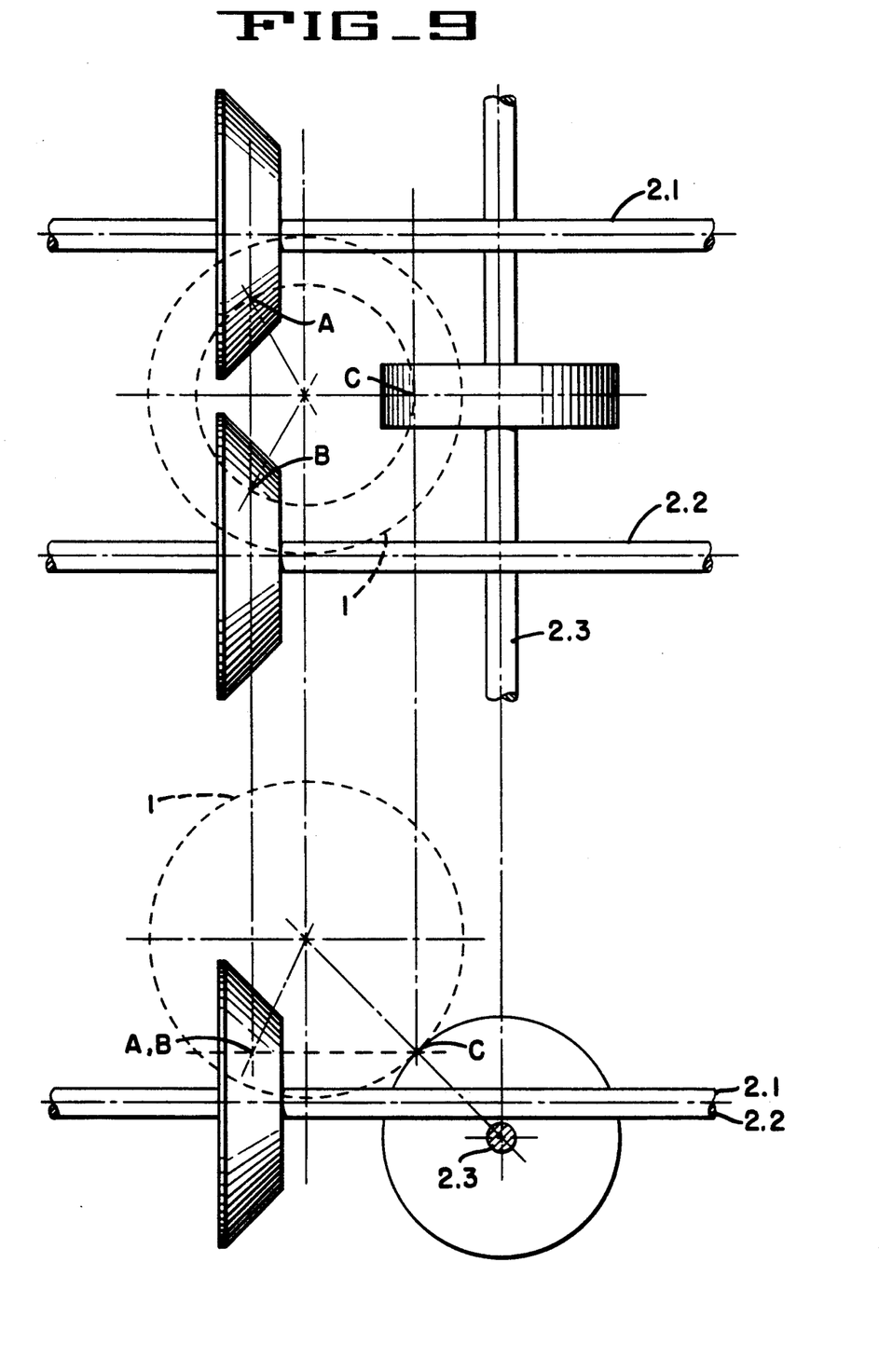
FIG. 9 depicts a variant of the three-point support of FIG. 7. This variant features fewer intersecting shafts.

FIG. 9 depicts an embodiment in which the number of levels in the shafts has been reduced to two with the aid of cone-shaped rollers. In addition, the recurrent pattern is rectangular, which presents advantages from an engineering point of view in the construction of rectangular structures such as, for instance, the component part D of FIG. 1.

Figure 10:
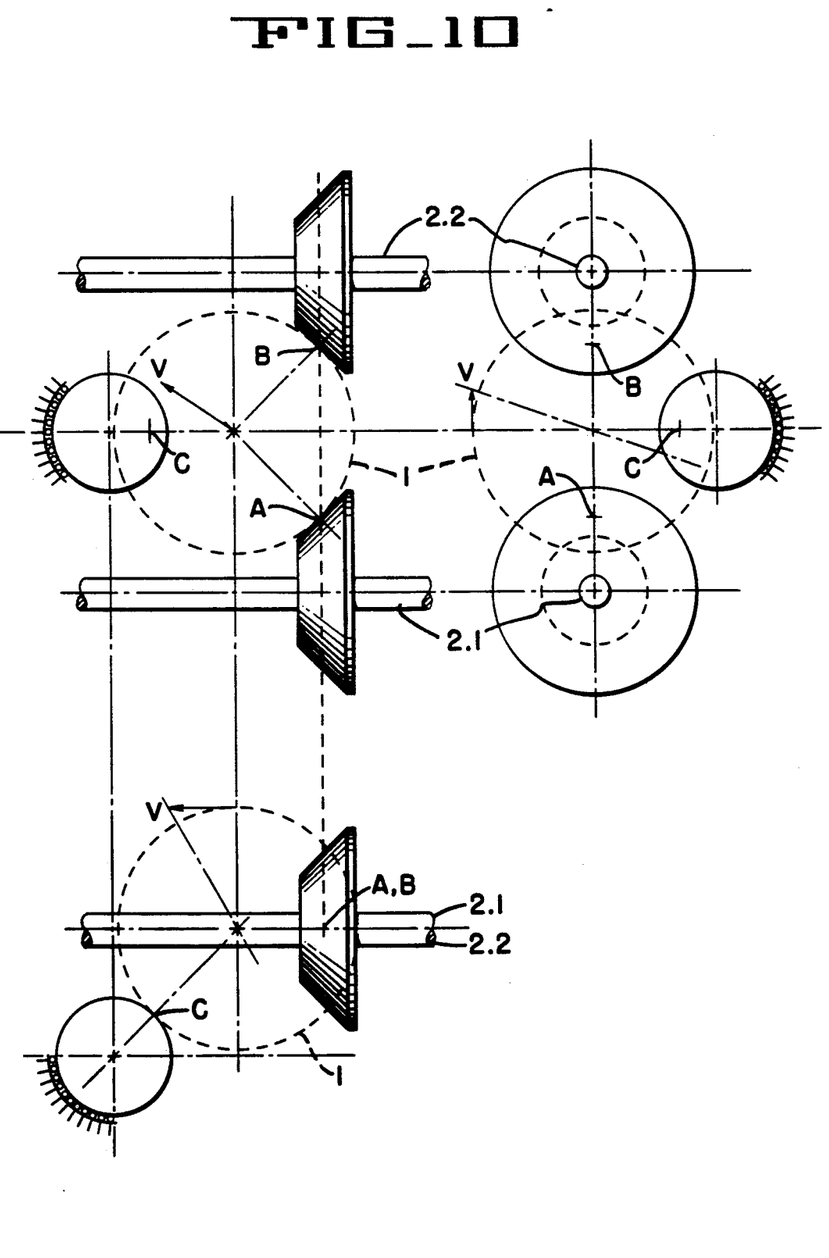
FIG. 10 shows a variant of the three-point support of FIG. 9. This variant features no intersecting shafts.

FIG. 10 shows an example of a variant of FIG. 9, in which the intersecting driving shaft has been replaced by a freely rotating supporting ball. As one drive unit has been omitted it is now only the two cones which have to furnish the driving force in all directions. The effects of internal slip must therefore be minimized, which is achieved by positioning the ball precisely between the shafts. As the ball has to rotate on a horizontal axis the horizontal velocity of the ball's surface at the level of the centre of the ball is always equal to zero. So, at points A and B there is no horizontal velocity and hence no slip. (For comparison with FIG. 4: r=0).

Figure 11:
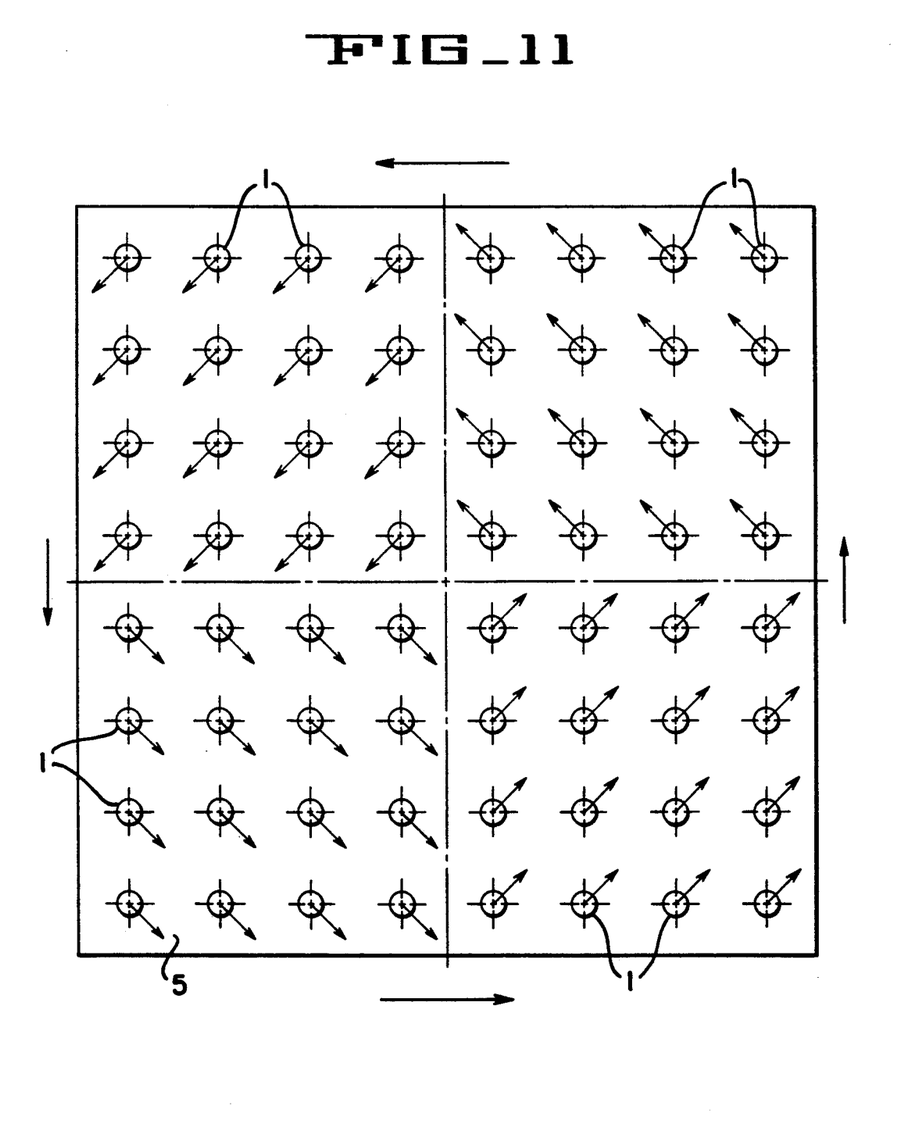
FIG. 11 schematically represents how a rotary motion can be effected.

FIG. 11 is a plan view, showing how a rotary motion can be brought about. In this example the balls 1 have been divided into four groups such that the balls of one group drive the goods in one specific direction. The directions of the several groups may be at right angles to each other.

Figure 12:
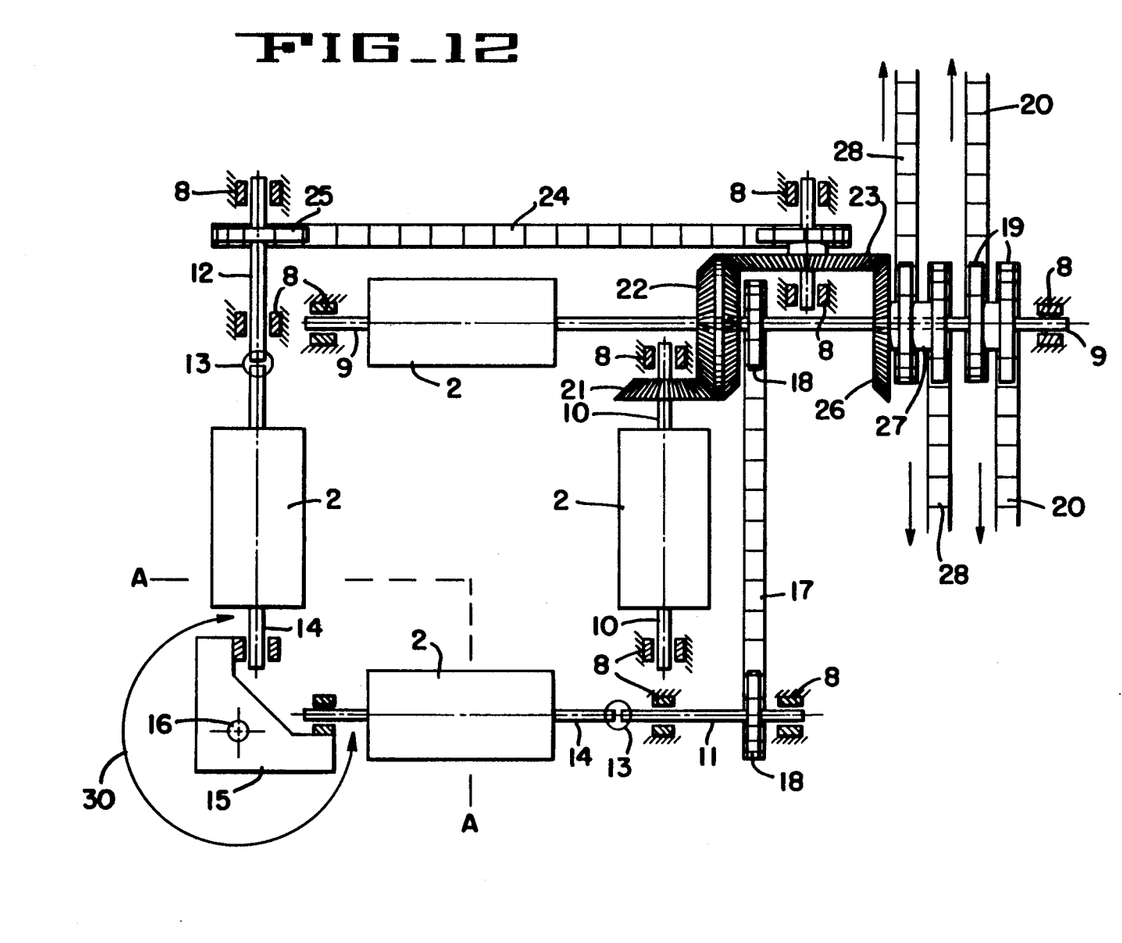
FIG. 12 shows an embodiment in which a ball is at all times supported steadily with a drive in which adjacent balls are interconnected.

FIG. 12 is a plan view of an embodiment in which it is indicated
- how the four rollers 2 can be suspended in such a fashion that ball 1 invariably rests uniformly on the four rollers;
- how the drive of the rollers 2 can be laid out such that the conveyor system's own height is not affected adversely by intersecting shafts.

The bearings 8 of shafts 9, 10, 11 and 12 are fixed in position, so that these shafts can only rotate on their axis. Shafts 11 and 12 are provided with flexible couplings 13 to which the shafts 14 carrying the rollers 2 have been attached. The other ends of shafts 14 rest in a yoke 15 which can move freely about a shaft 16 in the way indicated by the circular arrow 30. As soon as a ball 1 is positioned between the rollers 2, the yoke 15 will assume such a position that the four rollers support the ball uniformly.

The shafts 9 and 11 are interconnected through a chain 17 and the single sprocket wheels 18. Shaft 9 is driven by the double sprocket wheel 19 which is connected through chains 20 to other ball drives of the conveyor system. Shafts 10 and 12 are not interconnected directly through a chain, because the shafts 9 and 10 lie in the same plane. The coupling is effected through a gear wheel transmission at right angles. A bevel gear wheel 21 is rigidly mounted on shaft 10 and engages a gear wheel 22 which can freely rotate on shaft 9.

The gear wheel 22 has a double bevel configuration and also meshes with a gear wheel 23 mounted on an ancillary shaft. Gear wheel 23 and shaft 12 are interconnected through a chain 24 and a few sprocket wheels 25. Gear wheel 23 is driven by means of a gear wheel 26 which is attached to double sprocket wheels 27. These sprocket wheels 27 and gear wheel 26 can together rotate freely on shaft 9. The sprocket wheels 26 are coupled to other ball drive units of the conveyor system through chains 28.

Figure 13:
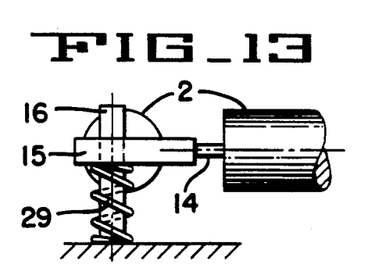
FIG. 13 shows an example of how protection against overloading can be attained in a support.

FIG. 13 shows in more detail following the line A—A in FIG. 12 how a support may be designed so as to have sufficient flexibility that in the event of overloading a ball can come to rest on a support 6 (see also FIG. 3).

Figure 14:
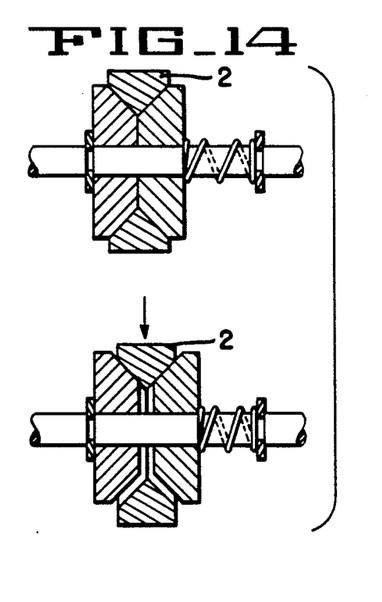
FIG. 14 shows an example of how protection against overloading can be attained in a roller.

FIG. 14 shows in detail how a roller may itself be designed so as to have sufficient flexibility that in the event of overloading a ball can come to rest on a support 6.

Figure 15:
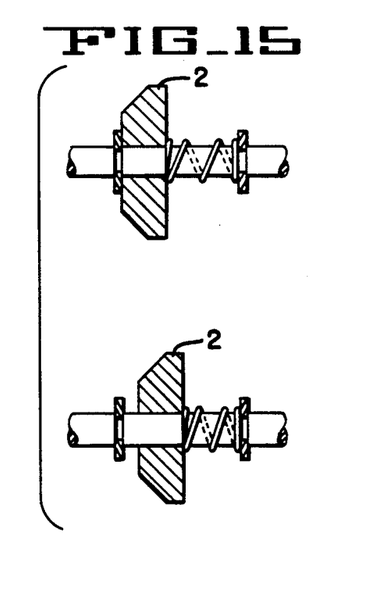
FIG. 15 shows an example of how protection against overloading can be attained in a cone-shaped roller.

FIG. 15 shows in detail how a coneshaped roller may itself be designed so as to have sufficient flexibility that in the event of overloading a ball can come to rest on a support 6.

I claim:

1. A conveyor system with driven balls, in which each driven ball is supported by at least one driving roller, said driving roller having an axis which is located in a substantially horizontal plane through the center of the driven ball, and the driven ball is supported by a freely rotating element with the driven ball resting between the driving roller and the freely rotating element.

2. A conveyor system with driven balls, in which each driven ball is supported by two driving rollers provided with oppositely bevelled surfaces, each approximately 45°, and the two driving rollers having respective shafts which are approximately parallel and are provided with independent drive units, each driving roller having an axis which is located in a substantially horizontal plane through the center of the driven ball, and the driven ball being supported by a freely rotating ball and the driving rollers, the driven ball resting between the driving rollers and the freely rotating ball.

* * * * *